J. F. Gesner,

Manf. Ice.

No. 107,898.　　　Patented Oct. 4, 1870.

Witnesses:

Inventor:
J. F. Gesner
PER Munn &Co
Attorneys.

United States Patent Office.

JOHN F. GESNER, OF WEST FARMS, NEW YORK.

Letters Patent No. 107,898, dated October 4, 1870.

IMPROVEMENT IN THE MANUFACTURE OF ICE.

The Schedule referred to in these Letters Patent and making part of the same

*To all whom it may concern:*

Be it known that I, JOHN F. GESNER, of West Farms, in the county of Westchester and State of New York, have invented a new and useful Improvement in the Manufacture of Ice; and I do hereby declare that the following is a full, clear, and exact description thereof, which will enable others skilled in the art to make and use the same, reference being had to the accompanying drawing forming part of this specification.

This invention relates to improvements in the manufacture of ice, and the refrigeration of air, and all fluids, liquids, and solid substances which it may be desirable to reduce to a low temperature.

The improvement consists in the construction and arrangement of the apparatus, the refrigeration being obtained (as in previous inventions) by the combined frigorific effect of the evaporation and heat conduction of liquid sulphurous anhydride, or binoxide of sulphur, (ordinarily called sulphurous acid,) chemical symbol $SO_2$, containing one equivalent of sulphur and two equivalents of oxygen.

Figure 4:
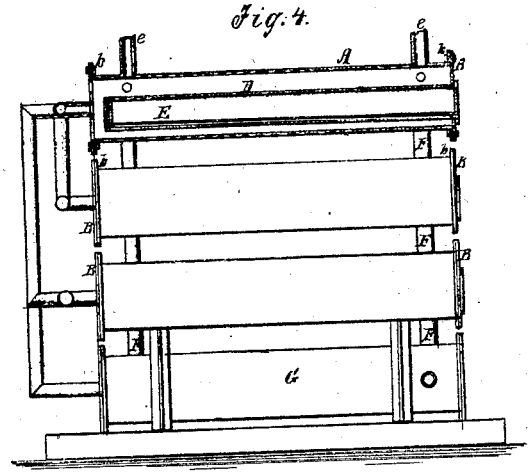
Figure 3:
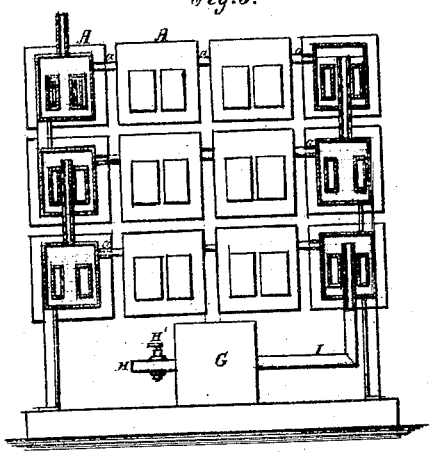
Figure 1:
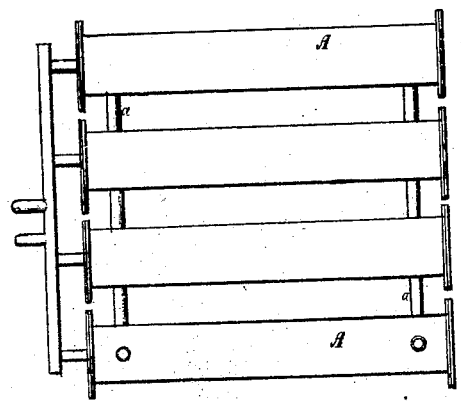
Figure 2:
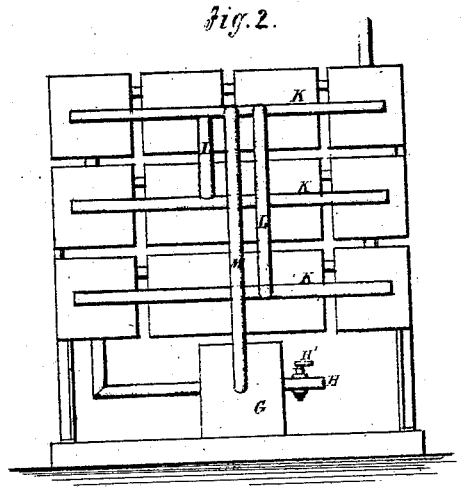

This combined evaporation and heat conduction is effected *in vacuo*, or in chambers deprived of atmospheric air, or under a pressure less than that of the atmosphere, viz., fifteen pounds per square inch, by the following apparatus, represented in plan view, Figure 1; end elevation in Figure 2; partly in end elevation and partly in section, Figure 3; and partly in side elevation and section in Figure 4.

Sulphurous anhydride, $SO_2$, is a gas under the ordinary pressure of the atmosphere above, about 14° Fahrenheit's thermometer.

When reduced, however, to the temperature of zero 0° Fahrenheit, under the ordinary pressure of the atmosphere, by an ordinary freezing-mixture of ice and salt, at which temperature and pressure its evaporation is slow, or, when subjected to a pressure of about thirty pounds per square inch above that of the atmosphere at 60° Fahrenheit, it becomes a mobile liquid.

This liquid, sulphurous anhydride, boils at about 14° Fahrenheit under the atmospheric pressure, but *in vacuo*, or in chambers deprived of atmospheric air, as in the apparatus described below, it boils and evaporates at a much lower temperature, producing intense cold in the remaining liquid.

I use chambers or cases A, of iron or other metal, wrought or cast, the walls of which are of such thickness and size as to withstand a pressure test of sixty to seventy pounds per square inch. I prefer chambers from six to twelve inches square, and from six to twelve feet long.

These chambers, placed horizontally, are connected in series or rows, by tubes *a* joining their upper extremities, so that the passage from one oven to another will be above the surface of the liquid frigorific substance. These chambers are made open at the ends, with a flange, *b*, at each end, to which is securely and tightly bolted a head or cap, B.

Within these larger chambers are placed smaller chambers D, surrounded by indirect contact with and beneath the surface of the liquid sulphurous anhydride contained in the larger chambers. These combined chambers I denominate frost-ovens.

Within the smaller chambers, contained in the larger ones and closely fitting them, are placed trays E, containing the water to be frozen.

These trays may be of any convenient length, depth, and diameter. I prefer them of two inches diameter, and of such length and depth as to contain from fifty to one hundred pounds of water, for convenience of handling.

The smaller contained chambers and water-trays may be of any metal suitable for the purpose.

I prefer copper for the smaller chambers, and tinned copper for the water-trays.

Any number of these frost-ovens are placed in rows, horizontally and vertically, so as to form a compact arrangement to any convenient height and breadth, and the chambers at the end of a horizontal row connected with the row below, as shown, by tubes F, which extend nearly to the top of the upper cases, so that the liquid will be maintained at the required level.

Beneath the series of chambers constituting the frost-ovens is placed a reservoir, G, similar in shape and size to the exterior case of a frost-oven, with an attached pipe, H, and connected to one of the ovens of the lower row by a tube, I.

This vessel I term the exhaust-reservoir, being connected in practice, by the pipe H with a double-acting exhaust and compressing pump, to effect evaporation from the surfaces of the liquid sulphurous anhidride in the frost-ovens.

In order to still further equalize the evaporation of the liquid in frost-ovens, each series or row is connected behind with the exhaust-reservoir H below by pipes, arranged as represented in fig. 2, K being horizontal tubes, one for each row of frost-ovens, the lower ones connected to the upper one by tubes L, and the latter connected to the exhaust-reservoir by the tube M.

The exhaust-reservoir G also serves to retain any surplus fluid.

The action of the machine is as follows:

The atmospheric air is first withdrawn from the apparatus by means of the double-acting exhaust and compressing-pump before mentioned, connected with the pipe H, after which the stop-cock H' is closed. Then the supply-pipes e, being connected with a suitable reservoir or condenser containing the liquid sulphurous anhydride, are opened.

When a good vacuum is obtained, (to be indicated by a gauge attached to frost-ovens,) the liquid sulphurous anhydride is admitted into the frost-ovens through the said pipe e by opening their stop-cocks, with which they are provided.

The liquid sulphurous anhydride flows from the pipes e into the connected chambers or frost-ovens. As each chamber becomes full, the freezing-fluid overflows, by means of the connecting-pipes a a, into the next, filling each in turn.

When the chambers of one row are sufficiently full, the fluid overflows by the pipe F into the chamber below, filling the second row or series of chambers in like manner, and so on into the next series, by the next pipe F, for any number of rows. The last row communicates directly with the exhaust-reservoir G.

When the apparatus is filled to the level of the connecting-tubes a a, the flow of liquid is stopped, the cock H' opened, and the pump set in motion, the cocks of pipes e being closed.

The evaporated liquid is withdrawn in the form of gas from the surfaces of the sulphurous anhydride in each chamber or frost-oven, above the level of the smaller contained chambers, in which are the trays containing the water to be frozen.

The gaseous sulphurous anhydride withdrawn at each stroke of the pump is compressed at the next stroke in a coil of pipe or suitable condenser, surrounded by cold water, where it is retained till required for the next operation, from which condenser the liquid sulphurous anhydride is returned by a suitable apparatus to the frost-ovens to be again evaporated and returned in the liquid form. No loss of fluid thus occurs, the same fluid freezing an indefinite content of water.

Evaporation takes place from the surface of the fluid above the secondary chambers. The cold fluid of greater specific gravity than that below falls to the bottom, and warmer fluid takes its place. This, becoming colder in turn by the evaporation of a portion, falls, and the fluid below of a higher temperature rises to the surface.

Thus, by convection, currents are established in the liquid sulphurous anhydride in the cases A, which tend, by the heat conduction of the fluid, to the continual abstraction of caloric from the surfaces of the secondary chambers in direct contact with and surrounded by the freezing-liquid.

For the refrigeration of air, the smaller contained chambers are connected, after the manner of a coil of pipe, or coils substituted for them, connected by exterior pipes.

The air to be cooled is driven through the coil or coils by a blower of force-pump.

Having thus described my invention,

I claim as new and desire to secure by Letters Patent—

1. The cases A D, pipes a F, and troughs E, combined and arranged substantially as specified.

2. The arrangement of the horizontal connecting-pipes a and the vertical pipes F with the cases A, to maintain the liquid at the requisite height therein, substantially as specified.

3. The combination, with the frost-ovens A D, arranged substantially as described, of the exhaust-reservoir G and exhaust-pipe H, substantially as specified.

4. The combination, with the frost-ovens and the exhaust-reservoir G, of the tubes K L M, substantially as specified.

The above specification of my invention signed by me this 4th day of June, 1870.

JOHN F. GESNER.

Witnesses:
GEO. W. MABEE,
ALEX. F. ROBERTS.